United States Patent [19]

Capps et al.

[11] Patent Number: 5,367,453
[45] Date of Patent: Nov. 22, 1994

[54] METHOD AND APPARATUS FOR CORRECTING WORDS

[75] Inventors: Stephen P. Capps; Ernest H. Beernink, both of San Carlos; John R. Meier, Cupertino; David Temkin, San Francisco, all of Calif.

[73] Assignee: Apple Computer, Inc., Cupertino, Calif.

[21] Appl. No.: 101,507

[22] Filed: Aug. 2, 1993

[51] Int. Cl.$^5$ .............................................. G06F 15/20
[52] U.S. Cl. ......................... 364/419.13; 364/419.15; 382/37
[58] Field of Search ...................... 364/419.17, 419.13, 364/419.14, 419.15, 146, 192; 382/9, 13, 37, 38, 40; 395/155, 156, 159, 147, 146

[56] References Cited

U.S. PATENT DOCUMENTS

| | | | |
|---|---|---|---|
| 4,731,857 | 3/1988 | Tappert | 382/13 |
| 4,953,225 | 8/1990 | Togawa et al. | 382/13 |
| 5,231,698 | 7/1993 | Forcier | 395/146 |

OTHER PUBLICATIONS

O'Connor, Rory J., "Apple Banking on Newton's Brain", Apr. 22, 1992, San Jose Mercury News.
Weiman, Liza and Moran, Tom, "A Step Toward the Future", Aug. 1992, Macworld Magazine.
Soviero, Marcelle M., "Your World According to Newton", Sep. 1992, Popular Science Magazine.
Abatemarco, Fred, "From the Editor", Sep. 1992, Popular Science Magazine.

*Primary Examiner*—Donald E. McElheny, Jr.
*Attorney, Agent, or Firm*—Hickman & Beyer

[57] ABSTRACT

A method for correcting recognized words in a computer system including the steps or: (a) entering an ink object into a computer system with a pointing device; (b) recognizing the ink object as a word object; (c) displaying the word object on a display of the computer system; (d) detecting a correction request made by a user pertaining to the displayed word object; and (e) displaying a list of alternative words for the word object on the display. Preferably, the list of alternative words includes a shifted-case version of the word object, a number of alternative words provided by a word recognizer, and the original ink object that was entered into the computer system. A user can select one of these alternative words to replace the misrecognized word object. Alternatively, a user may enter a word into the computer system by means of a keyboard image to replace the original word object with the newly entered word. When using the keyboard correction mode, the user has the opportunity to add the word to a dictionary list used by a word recognizer of the computer system.

20 Claims, 12 Drawing Sheets

METHOD AND APPARATUS FOR CORRECTING WORDS

BACKGROUND OF THE INVENTION

The present invention relates generally to computer systems, and more particularly to methods and apparatus for editing recognized words entered into a pen-based computer system.

Computerized personal organizers are becoming increasingly popular with a large segment of the population. Computerized personal organizers tend to be small, lightweight, and relatively inexpensive, and can perform such functions as keeping a calendar, an address book, a to-do list, etc. While many of these functions can also be provided in conventional computer systems, personal organizers are very well suited to the personal organization task due to their small size and portability. Personal organizers are available from such companies as Sharp and Casio of Japan.

A relatively new form of computer, the pen-based computer system, holds forth the promise of a marriage of the power of a general purpose computer with the functionality and small size of a personal organizer. A pen-based computer system is typically a small, handheld computer where the primary method for inputting data includes a "pen" or stylus. A pen-based computer system is commonly housed in a generally rectangular enclosure, and has a dual-function display assembly providing a viewing screen along one of the planar sides of the enclosure. The dual-function display assembly serves as both an input device and an output device. When operating as an input device, the display assembly senses the position of the tip of a stylus on the viewing screen and provides this positional information to the computer's central processing unit (CPU). Some display assemblies can also sense the pressure of the stylus on the screen to provide further information to the CPU. When operating as an output device, the display assembly presents computer-generated images on the screen.

The dual-function display assemblies of pen-based computer systems permit users to operate the computer as a computerized notepad. For example, graphical images can be input into the pen-based computer by merely moving the stylus on the surface of the screen. As the CPU senses the position and movement of the stylus, it generates a corresponding image on the screen to create the illusion that the stylus is drawing the image directly upon the screen, i.e. that the stylus is "inking" an image on the screen. The stylus can therefore be used to enter "ink objects" into the computer system. With suitable recognition software, these ink objects can be recognized and converted into word objects, graphical objects, etc.

While word recognition software has steadily improved, it is still a fairly frequent occurrence that an ink object is misrecognized and replaced with an incorrectly "recognized" object. For example, an ink object representing a word may be incorrectly recognized as a different word than the one intended. The word object must then be edited or erased to replace the incorrect word object with the word object that the user intended. The correction of improperly recognized word objects can be a time consuming and frustrating task, particularly if several attempts have to be made to finally produce the correct word object.

SUMMARY OF THE INVENTION

The present invention provides for the quick and reliable correction of incorrectly recognized word objects. At the request of a user, a list of likely words are presented as potential replacements for the correctly recognized word object. Alternatively, the word object can be returned to its ink object form, or a keyboard can be presented to allow a user to type in a replacement word for the misrecognized word object.

Briefly, a method of the present invention includes the steps of: (a) entering an ink object into a computer system with a pointing mechanism: (b) recognizing the ink object as a word object; (c) displaying the word object on a display of the computer system; (d) detecting a correction request made by a user pertaining to the displayed word object; and (e) displaying a list of alternative words for the word object on the display. Preferably, the list of alternative words includes a shifted-case version of the word object, a number of alternative words provided by the word recognizer that had misrecognized the word object, and the original ink object. A user can select any one of the alternatives from the list, resulting in the replacement of the misrecognized word object with a replacement word object or a replacement ink object.

The method of the present invention can also include the step of displaying an icon representing a keyboard on the display along with the list of alternative words. If the icon representing a keyboard is selected by the user, a keyboard image is displayed on the screen which allows a word to be typed into the computer system to replace the misrecognized word object. Optionally, the word entered from the keyboard can be placed into a dictionary list of the computer system for future recognition purposes.

A computer system with word correction capabilities in accordance with the present invention includes a central processing unit (CPU), and a tablet apparatus coupled to the CPU which allows the entry of an ink object into the computer. A pen or stylus is used in conjunction with the tablet apparatus to enter the ink object into the computer system. The computer system also includes a recognizer apparatus operative to recognize the ink object as a word object, a display mechanism coupled to the CPU and operative to display the word object, a mechanism for detecting a correction request by a user pertaining to the displayed word object, and a mechanism for displaying a list of alternative words for the word object on the display mechanism.

An advantage of the method and apparatus of the present invention is that a misrecognized word object can be quickly and efficiently replaced with a corrected word. Alternatively, the misrecognized word can be replaced with the original ink object, if the user so desires. Also, a word entered by the user by means of the keyboard can, at the option of the user, be added to the dictionary list for future recognition purposes.

These and other advantages of the present invention will become apparent upon reading the following detailed descriptions and studying the various figures of the drawings.

BRIEF DESCRIPTION OF THE DRAWINGS

FIG. 4b illustrates a recognized object that was recognized from the ink object of FIG. 4a;

DETAILED DESCRIPTION OF THE PREFERRED EMBODIMENTS

The present invention is well suited for pointer based computer systems such as the pen-based, pen-aware and mouse controlled systems that are currently popular. For the purposes of illustration, the invention will be described in connection with a pen-based system.

Figure 1:
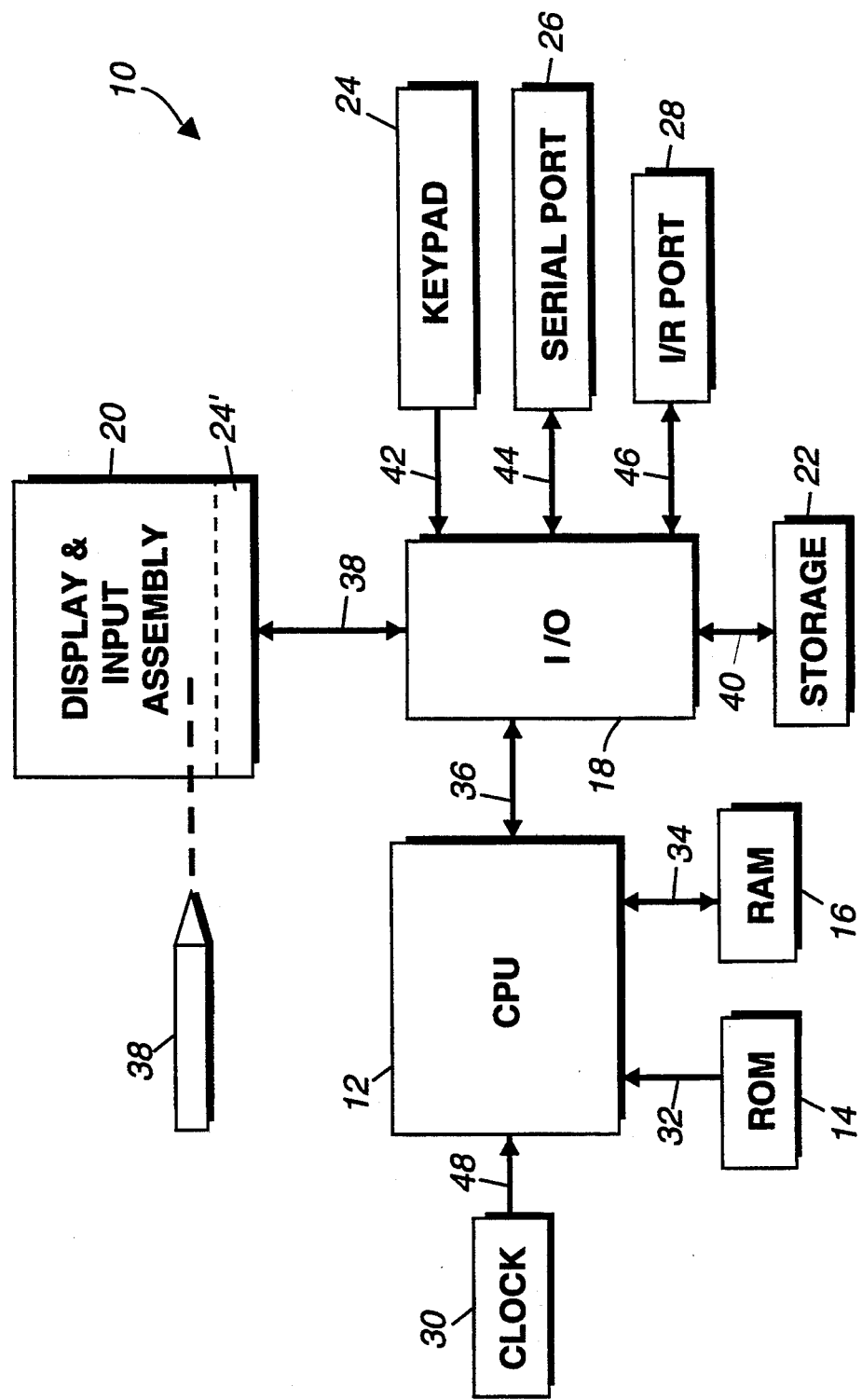
FIG. 1 is a block diagram of a computer system in accordance with the present invention.

As shown in FIG. 1, a pen-based computer system 10 in accordance with the present invention includes a central processing unit (CPU) 12, read only memory (ROM) 14, random access memory (RAM)) 16, input-/output (I/O) circuitry 18, and a display assembly 20. The pen-based computer system 10 may also optionally include a mass storage unit 22, a keypad (or keyboard) 24, a serial port 26, an infrared (I/R) port 28, and a clock 30.

The CPU 12 is preferably a commercially available, single chip microprocessor. While CPU 12 can be a complex instruction set computer (CISC) chip, it is preferable that CPU 12 be one of the commercially available, reduced instruction set computer (RISC) chips which are known to be of generally higher performance than CISC chips. CPU 12 is coupled to ROM 14 by a unidirectional data bus 32. ROM 14 preferably contains the basic operating system for the pen-based computer system 10. CPU 12 is connected to RAM 16 by a bi-directional data bus 34 to permit the use of RAM 16 as scratch pad memory. ROM 14 and RAM 16 are also coupled to CPU 12 by appropriate control and address busses, as is well known to those skilled in the art. CPU 12 is coupled to the I/O circuitry 18 by bi-directional data bus 36 to permit data transfers with peripheral devices.

I/O circuitry 18 preferably includes a number of latches, registers and direct memory access (DMA) controllers. The purpose of I/O circuitry 18 is to provide an interface between CPU 12 and such peripheral devices as display assembly 20, mass storage 22, keypad 24, serial port 26, and I/R port 28.

Display assembly 20 of pen-based computer system 10 is both an input and an output device. Accordingly, it is coupled to I/O circuitry 18 by a bi-directional data bus 38. When operating as an output device, the display assembly 20 receives data from I/O circuitry 18 via bus 38 and displays that data on a suitable screen. The screen for display assembly 20 is preferably a liquid crystal display (LCD) of the type commercially available from a variety of vendors. The input device of display assembly 20 is preferably a thin, clear membrane which covers the LCD display and which is sensitive to the position of a stylus 38 on its surface. With such a structure, the membrane of the display assembly 20 can serve as an input "tablet." These position sensitive membranes are also readily available on the commercial market. Alternatively, other types of tablets can be used, such as inductively coupled tablets. Combination display assemblies such as display assembly 20 which include both the LCD and the input membrane are commercially available from such vendors as Scriptel Corporation of Columbus, Ohio.

Some type of mass storage 22 is generally considered desirable. Mass storage 22 can be coupled to I/O circuitry 18 by a bi-directional data bus 40. However, the mass storage 22 can be eliminated by providing a sufficient amount of RAM 16 to store user application programs and data. In that case, the RAM 16 can be provided with a backup battery to prevent the loss of data even when the pen-based computer system 10 is turned off. However, it is generally desirable to have some type of long term mass storage 22 such as a commercially available miniature hard disk drive, nonvolatile memory such as flash memory, battery backed RAM, a PCMCIA card, or the like.

Figure 2:
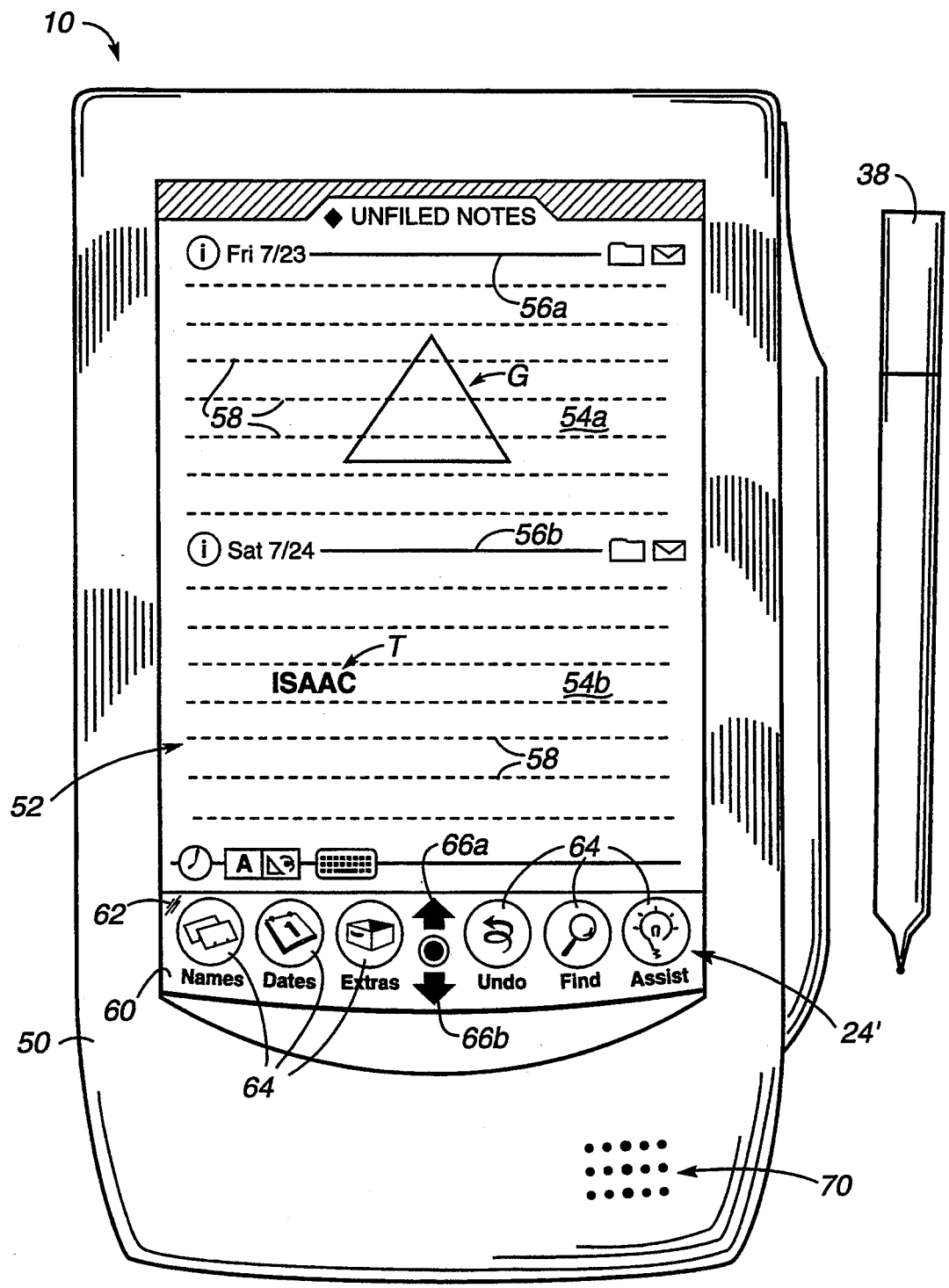
FIG. 2 is a top plan view of the screen, case, keypad, and stylus of the computer system of FIG. 1.

The keypad 24 can comprise an array of mechanical buttons or switches coupled to I/O circuitry 18 by a data bus 42. Alternatively, keypad 24 can comprise an entire, standard QWERTY keyboard. In the present embodiment, a separate keypad 24 is not used in favor of a "pseudo" keypad 24'. This "pseudo" keypad 24' comprises "button" areas which are associated with a bottom edge of the tablet membrane that extends beyond the lower edge of the LCD display. These button areas are defined by a printed or silk-screened icons which can be seen through the transparent membrane of the input tablet. When the "buttons" are selected by engaging the stylus 38 with the membrane over these printed icons, the membrane senses the pressure and communicates that fact to the CPU 12 via data bus 38 and I/O 18. An example of pseudo keypad 24' is shown in FIG. 2.

Other types of pointing devices can also be used in conjunction with the present invention. While the method of the present invention is described in the context of a pen-based system, other pointing devices such as a computer mouse, a track ball, or a tablet can be used to manipulate a pointer on a screen of a general purpose computer. Therefore, as used herein, the terms "pointer", "pointing device", "pointing means", and the like will refer to any mechanism or device for pointing to a particular location on a screen of a computer display.

Serial port 26 is coupled to I/O circuitry by a bi-directional bus 44. The serial port 26 can be used to couple the CPU to external devices and networks.

Infrared (I/R) port 28 is coupled to I/O circuitry by a bi-directional bus 46. The I/R port can be used for outgoing information (e.g. to control a printer or some other external device, or to communicate with other computer systems) or for incoming information from other computer or devices.

Clock 30 preferably comprises a real-time clock to provide real-time information to the system 10. Alternatively, clock 30 can simply provide regular clock pulses to, for example, an interrupt port of the CPU 12 which can count the clock pulses to provide the time function. However, this alternative clock embodiment tends to be wasteful of CPU processing power. Clock 30 is coupled to CPU 12 by a data bus 48.

In operation, information is input into the pen-based computer system 10 by "writing" on the screen of display assembly 20 with the stylus 38. Information concerning the location of the stylus 38 on the screen of the display assembly 20 is input into the CPU 12 via data bus 38 and I/O circuitry 18. Typically, this information comprises the Cartesian (i.e. x & y) coordinates of a pixel of the screen of display assembly 20 over which the tip of the stylus is positioned. Commercially available combination display assemblies such as the aforementioned assemblies available from Scriptel Corporation include appropriate circuitry to provide the stylus location information as digitally encoded data to the I/O circuitry of the present invention. The CPU 12 then processes the data under control of an operating system and possibly an application program stored in ROM 14, RAM 16, or mass storage 22. The CPU 12 next produces data which is transferred to the display assembly 20 via I/O circuitry 18 and data bus 38 to produce appropriate images on the screen portion of the display assembly 20.

In FIG. 2, the pen-based computer system 10 of FIG. 1 is shown housed within a generally rectangular enclosure 50. The CPU 12, ROM 14, RAM 16, I/O circuitry 18, and clock 26 are preferably fully enclosed within the enclosure 50. The display assembly 20 (FIG. 1) is mostly enclosed within the enclosure 50, but a viewing screen 52 of the display assembly is exposed to the user. As used herein, the term "screen" will refer to the portion of the display assembly 20 which can display an image that can be viewed by a user. Also accessible to the user is the pseudo keypad 24' that was described with reference to FIG. 1.

Upon power-up, pen based computer system 10 displays on screen 52 an initial "note" area 54a including a header bar 56a and a number of guidelines 58. The header bar 56a preferably includes the date of creation of the note area 54a and a number of icons and "soft" buttons, not particularly germane to the discussion of the present invention. For this reason, the header bar 56a will not be discussed in detail herein. The optional guidelines 58 aid a user in entering text, graphics, and data into the pen-based computer system 10. A graphic object G in the form of a triangle is shown entered within note area 54a.

Additional note areas, such as a note area 54b, can be formed by the user by drawing a substantially horizontal line across the screen 52 with the stylus 38. The substantially horizontal line is recognized by the system 10 and is converted into a second header bar 56b. Additional text, graphical, and other data can then be entered into this second note area 54b. For example, the text object T comprising "ISAAC" has been entered into second note area 54b.

In this preferred embodiment, the keypad 24', as explained previously, comprises a printed or silk-screened member 60 provided beneath a lower edge of a thin, clear, stylus-sensitive membrane 62 of the input "tablet." Alternatively, a keypad could comprise a mechanical keypad (or keyboard) 24, or a keypad could comprise "soft buttons" i.e. images generated at convenient locations on the screen 52, in which case a "button" would be activated by touching the stylus to the screen over the image of the button. The keypad 24' preferably includes a number of dedicated function buttons 64 and a pair of scroll buttons 66a and 66b. The operation of the note areas 54a, 54b, etc., scroll buttons 66a and 66b, and other aspects of computer system 10 are discussed in greater detail in copending U.S. patent application Ser. No. 07/868,013, filed Apr. 13, 1992 on behalf of Tchao et al., assigned to the assignee of the present invention and incorporated herein by reference in its entirety.

The screen illustrated in FIG. 2 is referred to as the "notepad", and is preferably an application program running under the operating system of the pen based computer system 10. In this preferred embodiment, the notepad is a special or "base" application which is always available beneath higher level applications. The notepad application, like other applications, run within a window, which in this instance comprises the entire viewing screen 52. Therefore, as used herein, a "window" is the entire screen or any portion of an entire screen which is dedicated to a particular application program.

A status bar 68 is provided at the bottom of the notepad application. The status bar 68 is provided with a number of active and display areas, which again are not particularly germane to the present invention and will therefore not be discussed in detail herein. U.S. patent application Ser. No. 07/976,970 filed Nov. 16, 1992 on behalf of Foster et. al, entitled "Status Bar for Application Windows" and assigned to the assignee of the present invention describes how to make and use the status bar, and is incorporated herein by reference in its entirety.

The enclosure 50 is preferably provided with apertures 70 which permit the free transmission of sound from a speaker (not shown) which is housed within enclosure 50. The speaker can be driven by the CPU 12, by I/O circuitry 18, or by specialized sound chips, as is well known to those skilled in the art. The speaker can be used to provide user feed-back, or to transmit audible information to a user.

The term "object" will be used extensively in the following discussions. As is well known to software developers, an "object" is a logical software unit comprising data and processes which give it capabilities and attributes. For example, an object can be queried as to its type and can return such data as the number of words that it contains, what its bounding box (BBOX) is, etc. Objects can contain other objects of the same or of a different type. Objects can also be used to project images; on a screen according to their object type. Example of object types used in the following description include paragraph, line, and word objects. There are many well known texts which describe object oriented programming. See, for example, *Object Oriented Programming for the Macintosh*, by Kurt J. Schmucher, Hayden Book Company, 1986.

In the present invention, objects are preferably implemented as part of a frame system that comprises frame objects related by a semantic network. A description of semantic networks can be found in "A Fundamental Tradeoff in Knowledge Representation and Reasoning", *Readings in Knowledge Representation*, by Brachman and Leveseque, Morgan Kaufman, San Mateo, 1985.

It will be noted there is a liberal use of graphic elements in the present invention. For example, the header bars 56a and 56b include line and other graphical elements. Processes for drawing lines on a computer screen are well known to those skilled in the art. For example, graphics software such as QUICKDRAW from Apple Computer, Inc. of Cupertino, Calif. can be used to draw lines, simple geometrical shapes, etc. A description of the QUICKDRAW graphics software is found in the book *Inside Macintosh, Volumes I, II, and III*, by C. Rose et al., Addison-Wesley Publishing Company, Inc., July 1988. With such graphics software, a line can be drawn by simply specifying the coordinates of the beginning and the end of the line, and by specifying the width of the line.

Another preferred tool for implementing the system of the present invention is a view system. Various types of view systems are well known to those skilled in the art. In the present system, the notepad application on the screen 52 forms a first or "root" layer, with the status bar 68, for example, positioned in a second layer "over" the root layer. The various buttons of the status bar 68 are positioned in a third layer "over" the second and root layers. The view system automatically handles "taps" and other gestures of the stylus 38 on the screen 52 by returning information concerning the tap or gesture and any object to which it may be related. Again, the status bar 68 and the view system is described in greater detail in copending U.S. patent application Ser. No. 07/976,970, which has been incorporated herein by reference.

The object oriented programming, frame system, and view system software makes the implementation of the processes of the present invention less cumbersome than traditional programming techniques. However, the processes of the present invention can also be implemented in alternative fashions, as will be well appreciated by those skilled in the art.

Figure 3:
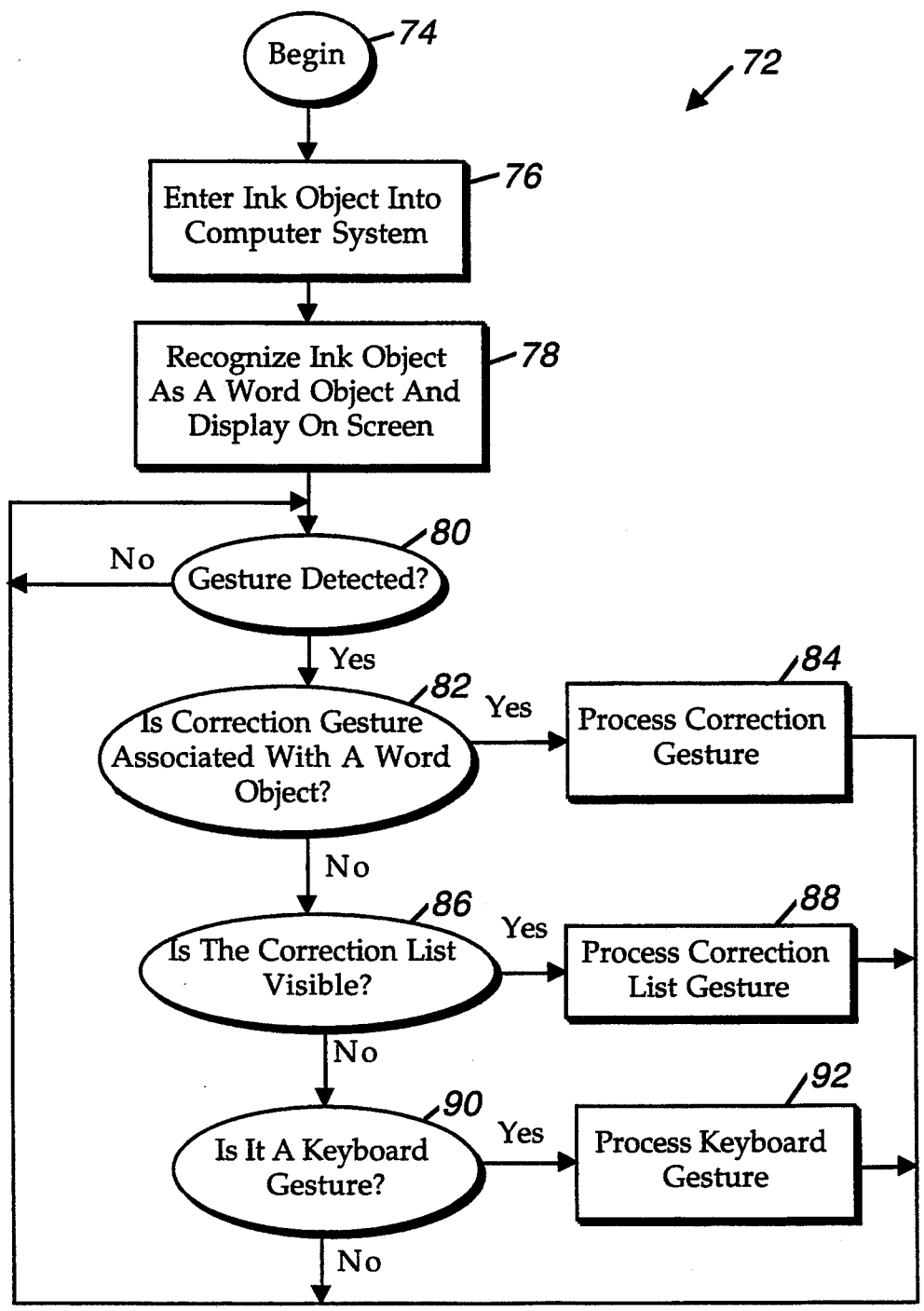
FIG. 3 is a flow diagram of a method and apparatus for correcting words in accordance with the present invention.

In FIG. 3, a process 72 for correcting recognized word objects in a computer system begins at 74 and, in a step 76, an ink object is entered into the computer system. As described previously, the ink object is preferably entered by means of a stylus 38 which engages stylus sensitive membrane 62 (i.e., the "tablet"). Preferably, but not necessarily, the ink object is displayed on the screen 52 of the computer system 10. Next, in a step 78, the ink object is recognized as a word object and is displayed on the screen 52. Then, in a decision step 80, it is determined whether the stylus 38 has made a gesture on the screen 52. As used herein the term "gesture" can mean anything from a simple click or tap on the screen 52 to a complex but recognizable stroke on the screen 52. If a gesture is not detected by step 80, the process goes into a wait state awaiting a gesture. Of course, other computer implemented processes can be executing on the computer system 10 while step 80 is waiting for a gesture.

If a gesture is detected by step 80, a decision step 82 determines whether it is a correction gesture associated with a word object. If it is, the correction gesture is processed in a step 84, and process control returns to step 80. A preferred correction gesture associated with a word object comprises a double tap of the stylus on the screen 52 within the bounding box of the word object. A double tap can be defined as the engagement of the stylus 38 with the screen 52, the lifting of the stylus 38 from the screen, and the reengagement of the stylus 38 with the screen 52 within a short period of time, e.g. ¼ of a second. Of course, other gestures can be used to indicate a correction request by a user. Also, other mechanisms for indicating a correction request, such as pushing a button, can also be used.

If step 82 determines that the gesture detected by step 80 is not a correction gesture associated with a word object a decision step 86 determines whether the correction list is visible. The correction list will be discussed in greater detail with reference to FIG. 5 and FIG. 6a. If the step 86 determines that the correction list is visible, a step 88 processes the correction list gesture, and then process control is returned to step 80.

If the decision step 86 determines that the correction list is not visible, a decision step 90 determines whether the gesture detected by step 80 is a keyboard gesture. The keyboard will be discussed in greater detail with reference to FIGS. 9 and 10. If step 90 determines that it is a keyboard gesture, a step 92 processes the keyboard gesture and the process control is returned to step 80. If it is determined that the gesture is not a keyboard gesture, process control is again returned to the decision step 80.

Figure 4B:
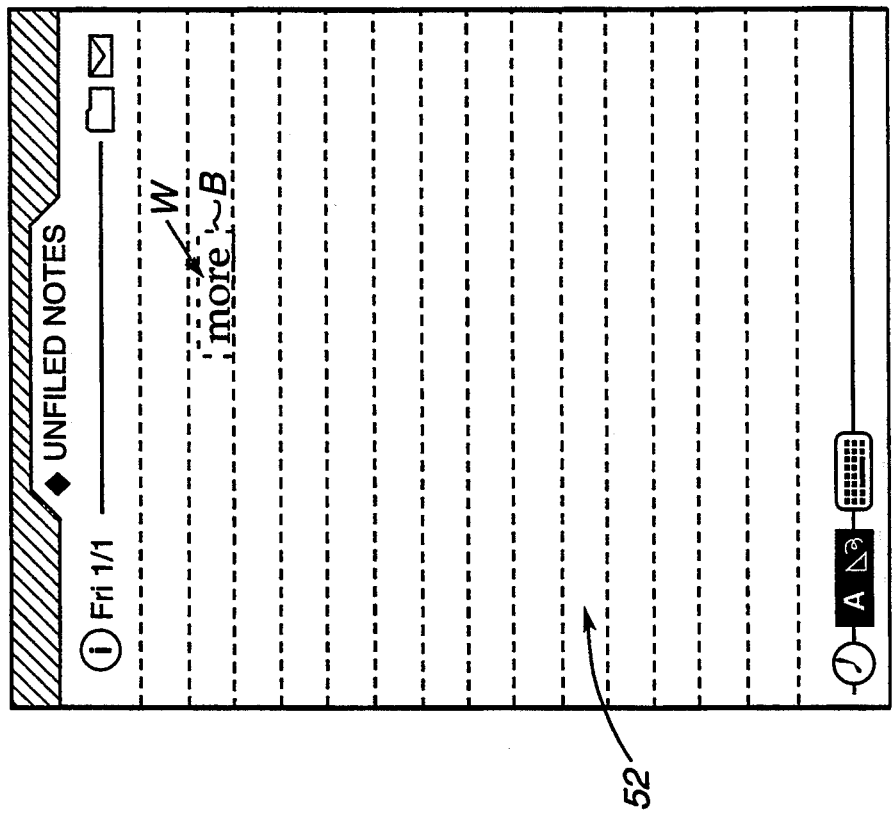
Figure 4A:
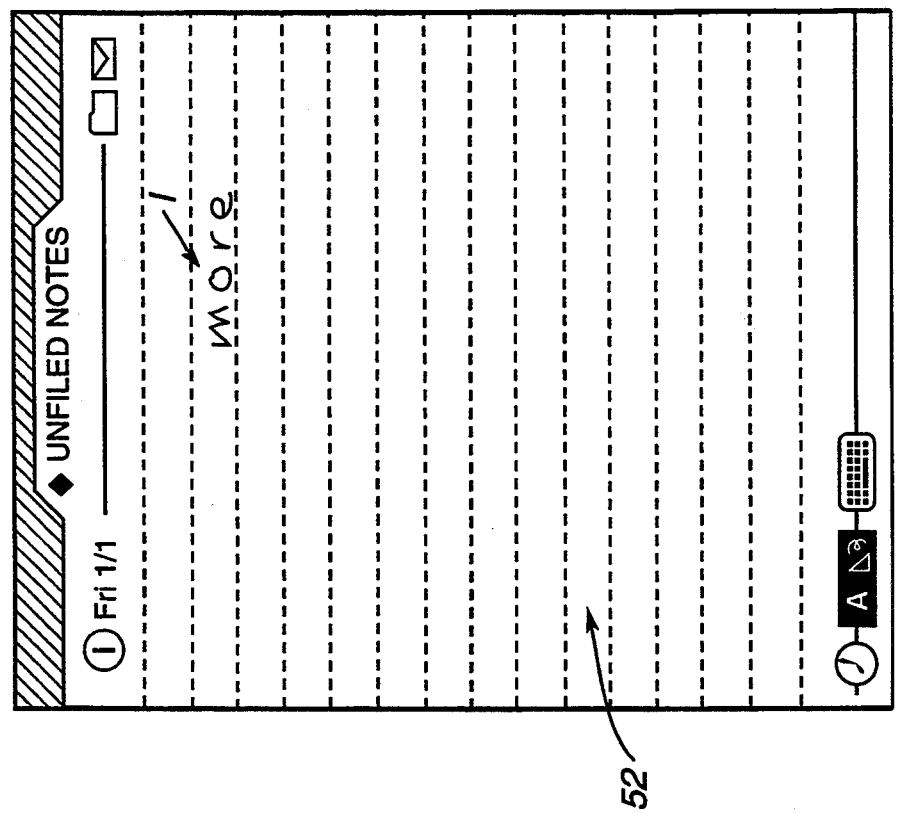
FIG. 4a illustrates an ink object that was entered into the computer system.

In FIG. 4a, an ink object "I" has been entered into the computer system 10 and is displayed on the screen 52. In FIG. 4b, the ink object I has been recognized by a word recognizer of the system 10 and is replaced with the word object W. A preferred word recognizer is described in copending U.S. patent application Ser. No. 08/068,443 filed May 27, 1993 on behalf of E. Beernink, entitled "Method and Apparatus for Recognizing Handwritten Words", assigned to the assignee of the present invention, the disclosure of which is incorporated herein by reference in its entirety. Another preferred recognizer is the word recognizer sold and licensed by ParaGraph, Inc. However, as mentioned previously, word recognizers are well known to those skilled in the art and any number of commercially available word recognition systems can be used to convert an inked object into a recognized word object for the purposes of the present invention.

As seen in FIG. 4b, the recognized word object W is surrounded by a bounding box B, shown here in broken line. While the bounding box B may be visible on screen 52, preferably the bounding box is invisible. A bounding box B is defined as a minimum rectilinear box which completely surrounds an object, such as word object W.

Figure 5:
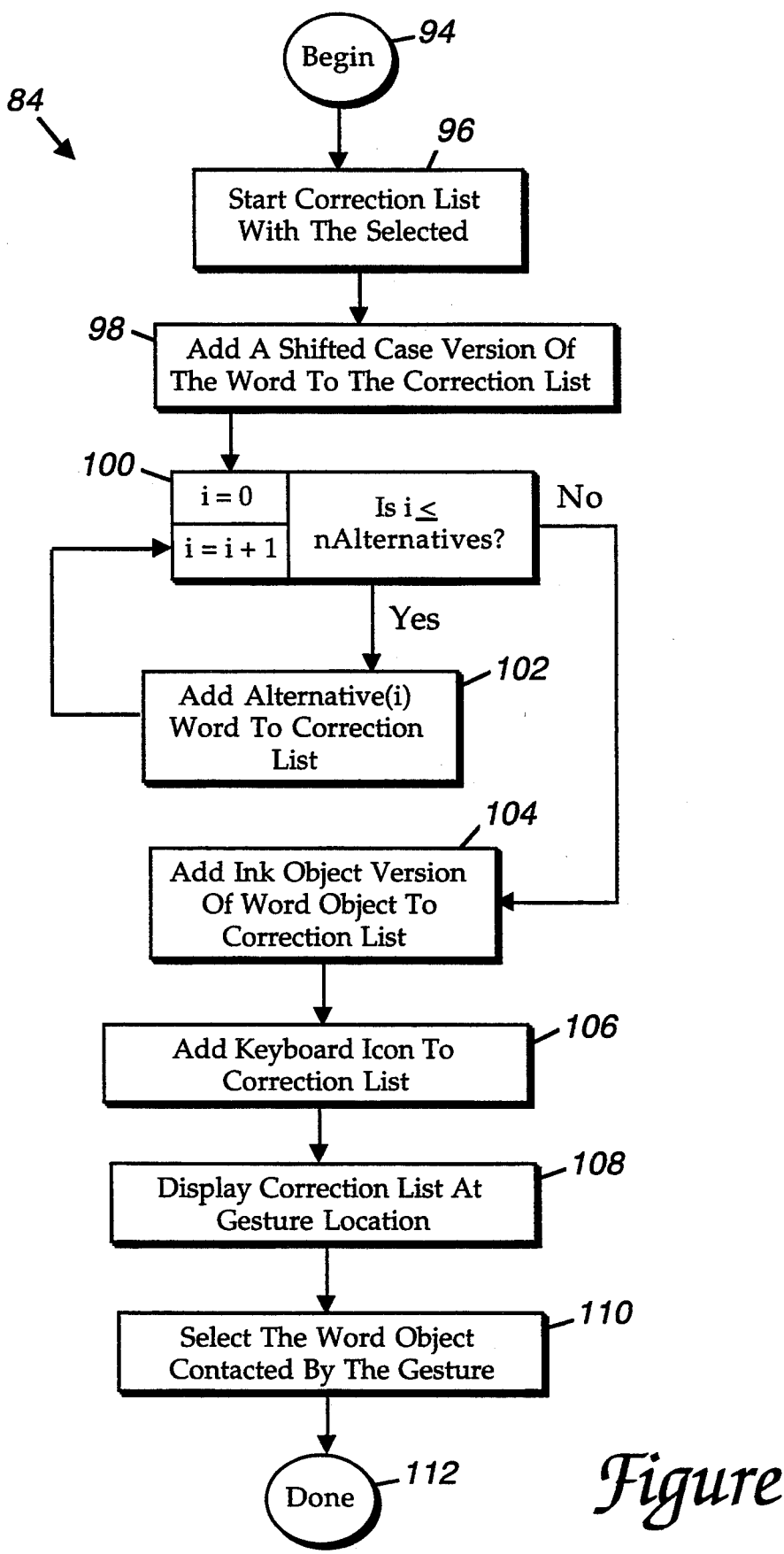
FIG. 5 is a flow diagram of the "Process Correction Gesture" step of FIG. 3.

In FIG. 5, a process step 84 of FIG. 3 is illustrated in greater detail. The process 84 begins at 94 and, in a step 96, a correction list is started with the selected word. For example, the word "more" in FIG. 4b can be selected by providing a double tap gesture within the bounding box B of FIG. 4b. Next, a shifted-case version of the word is added to the correction list. In this example, the shifted-case version of the word "more" is the word "More". Next, in an iterative loop step 100, a counter i is set to zero and is then compared to the number of alternatives "nAlternatives", which is preferably a subset of alternative words derived by the word recognition system for the misrecognized word object W. Many word recognition systems have the ability to provide not only the word recognizer's first choice for a recognized word, but also a number of alternative choices. These alternative choices are ranked by the word recognizer as to their likelihood of being correct. For example, the misrecognized word object W might have a rank of 82 out of 100, the first alternative might have a rank of 74, the third alternative might have a rank of 69, and so forth. A description of this process is found in co-pending U.S. patent application Ser. No. 08/099,847, filed Jul. 30. 1993 on behalf of Beernink et al., entitled "Method for Correcting Handwriting on a Pen-Based Computer", assigned to the assignee of the present invention, the disclosure of which is incorporated herein by reference in its entirety.

If the variable i is less than or equal to nAlternatives, then alternative(i) is added to the correction list in a step 102. The variable nAlternatives can be provided by the word recognizer, but is preferably a fixed number of alternatives, e.g. four (4) alternatives. In other words, the process of the present invention would select the top 4 alternatives provided by the word recognizer. When added to the shifted-case alternative, this presents the user with five alternative words. Process control is then returned to the iterative loop step 100 to iterate the counter i by one. The loop comprising steps 100 and 102 is repeated until all of the nAlternatives are added to the correction list. After i is greater than nAlternatives, a step 104 adds the ink object version of the word object to the correction list. Then, in a step 106, a keyboard icon is added to the correction list. Next, in a step 108, the correction list is displayed on the screen 52 at the location that the gesture was made. Finally, the word object W that had been contacted by the gesture is selected on the screen 52, and the process is completed at 112.

Figure 6B:
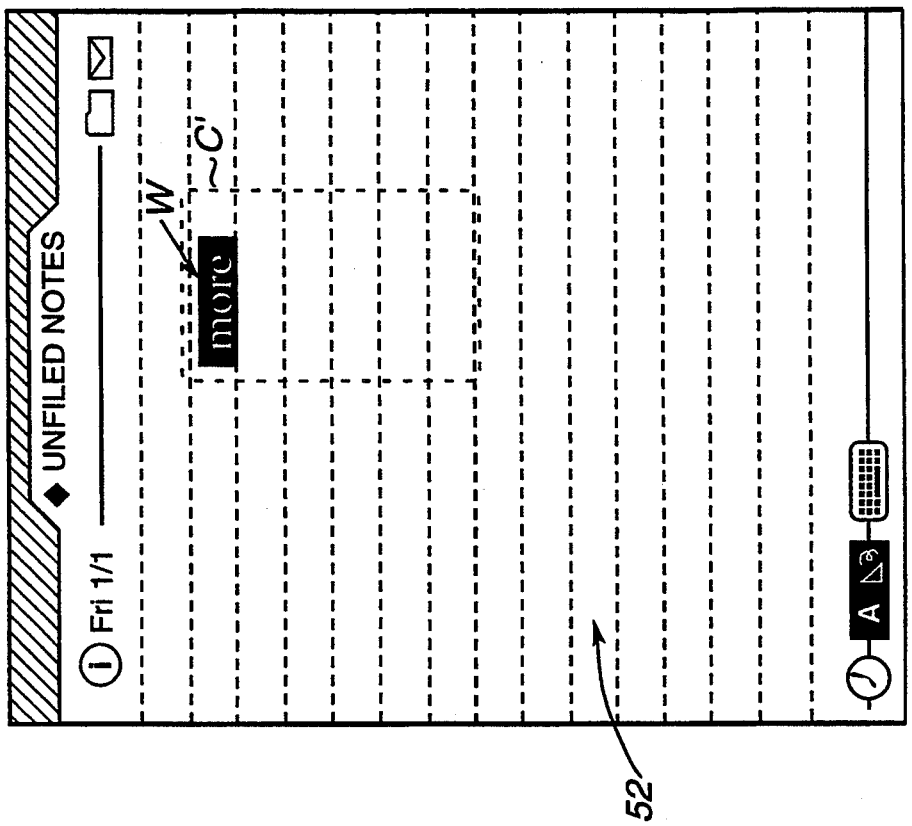
FIG. 6b illustrates the selection of an original word object by the process of FIG. 5.
Figure 6A:
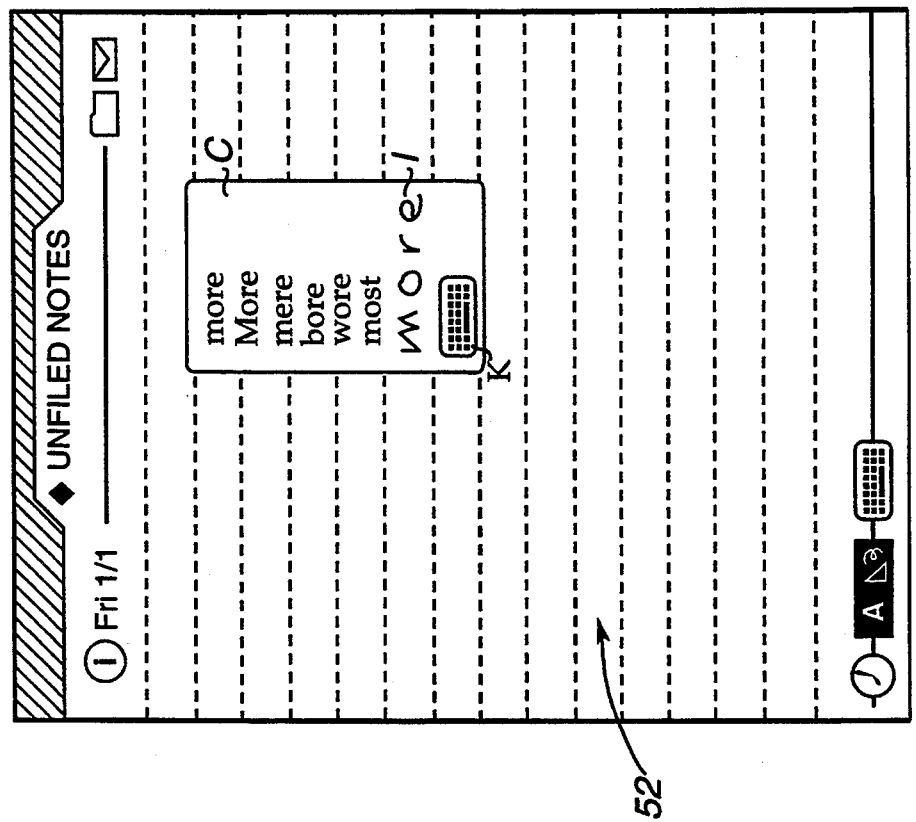
FIG. 6a illustrates a correction list created by the process of FIG. 5.

In FIG. 6a, a correction list C produced by the process 84 of FIG. 5 is shown displayed on the screen 52. The first word in the list is the word object W that was selected by the gesture. The second word in the list is a shifted-case version of the word where the first letter of the shifted-case version is the opposite case as the first letter of the original word object. Therefore, if the original word object is "more", the shifted-case version is "More". Alternatively, if the originally selected object was "More", the shifted-case version of the word object would be "more". Following the shifted-case version of the word, are four alternative words provided by the word recognizer bringing, as mentioned above, the total number of alternative words to five. Preferably, the four following words are listed in the order of the word's word recognizer confidence in the correctness of those words. After the words presented by the word recognizer are listed, an ink object version "I" of the original word is displayed in the correction list C. Finally, at the bottom of the word correction list C, a keyboard icon "K" is displayed.

FIG. 6b is the same as FIG. 6a, with the exception that the correction list C has been removed to show that the original word object W has been selected on the screen 52. This selection is indicated by reverse video, in this case. The location of the correction list C is indicated in broken lines at C'. In the present embodiment, the screen illustrated in FIG. 6b is not typically visible to the user.

Figure 7:
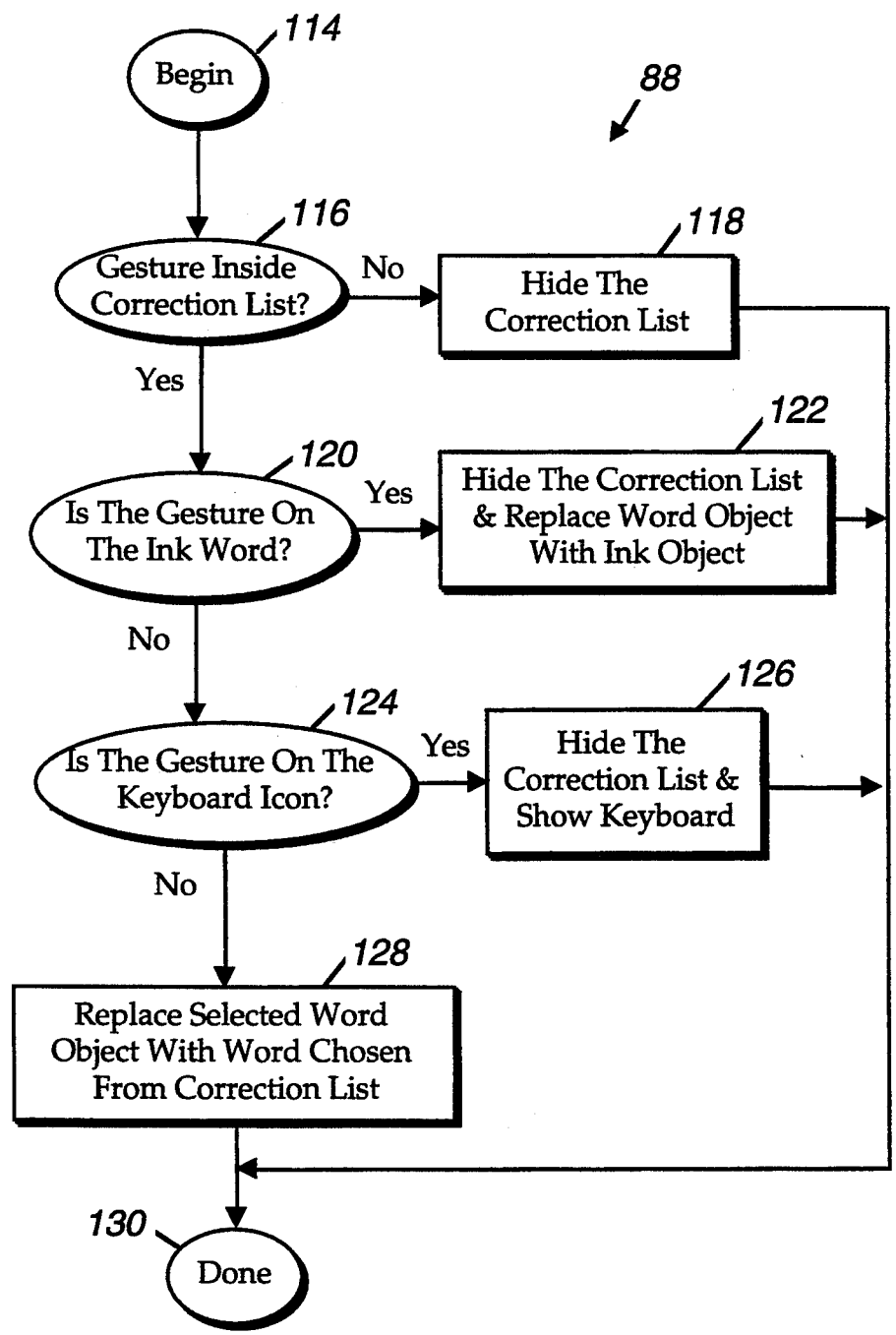
FIG. 7 is a flow diagram illustrating the "Process Correction List Gesture" step of FIG. 3.

In FIG. 7, the process step 88 of FIG. 3 is described in greater detail. The process 88 begins at 114 and, in a decision step 116, it is determined whether the gesture is inside the correction list. If the gesture is not within the correction list (i.e. it is elsewhere on the screen 52), a step 118 hides the correction list. By "hide" it is meant that the view system of the present invention is told to remove the image of the correction list C from the screen 52. For example, if a gesture is made on the screen 52 outside of the correction list C in FIG. 6a, the correction list C will be removed from view. After the execution of step 118, the process 88 is concluded at 130.

Alternatively, if the step 116 determines that the gesture is inside the correction list, a step 120 determines whether the gesture is on the ink word version I. If so, the correction list C is again hidden and the word object W is replaced with the original ink object on the screen 52 in a step 122. The process is then completed at 130.

If decision step 120 determines that the gesture is not on an ink word, it is then determined in a step 124 whether the gesture is on the keyboard icon K. If it is, then the correction list C is again hidden and a keyboard is displayed on screen 52 in the step 126. The process 88 is then completed as indicated at 130.

Finally, if step 124 determines that the gesture is not on the keyboard icon, it is assumed that one of the words on the correction list C has been selected, and the selected word object W (as seen in FIG. 6b) is replaced with the word chosen from the correction list. For example, if a user selected the word "bore" from the correction list C of FIG. 6a, the word "bore" would replace the word "more" of FIG. 6b. The process is then completed at 130.

Figure 8:
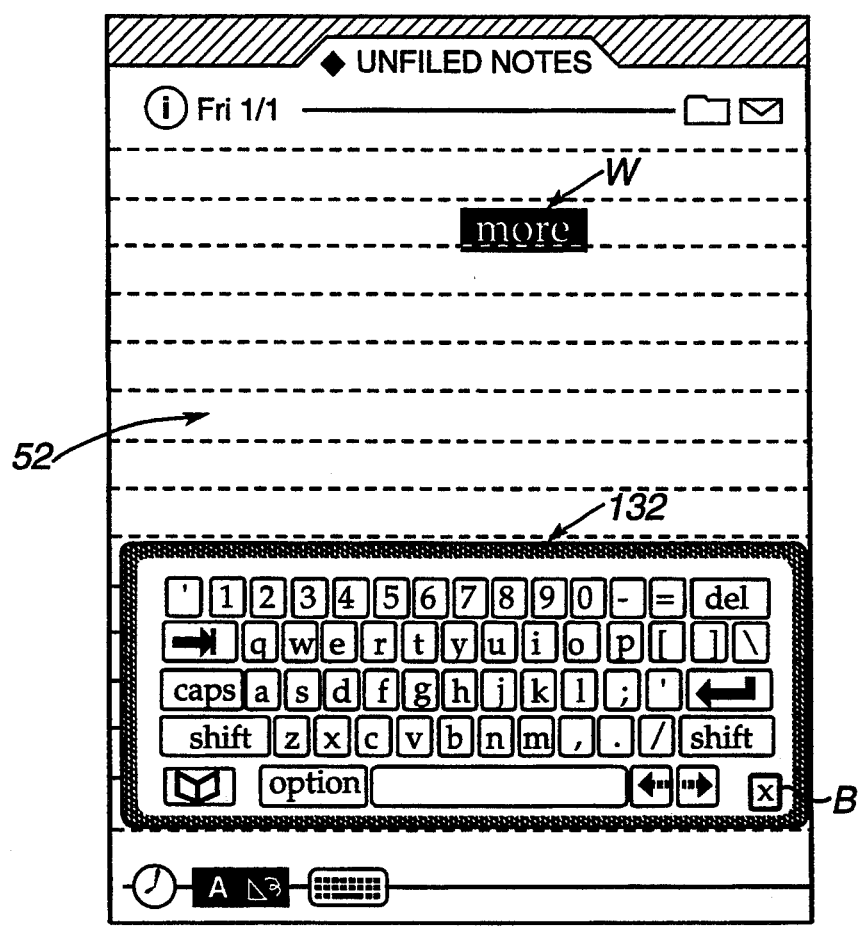
FIG. 8 illustrates the "Hide The Correction List And Show Keyboard" step of FIG. 7.

FIG. 8 is used to illustrate the step 126 of FIG. 7. As can be seen in FIG. 8, the correction list C has been removed from the screen 52 allowing the selected word object "more" to be seen on the screen 52. A functional image of a keyboard 132 is displayed on the lower portion of the screen 52. The "keys" of the keyboard 152 can be activated by tapping the keys with the stylus 38. In this way, a word can be explicitly entered into the computer system 10 to replace a misrecognized word object W.

Figure 9:
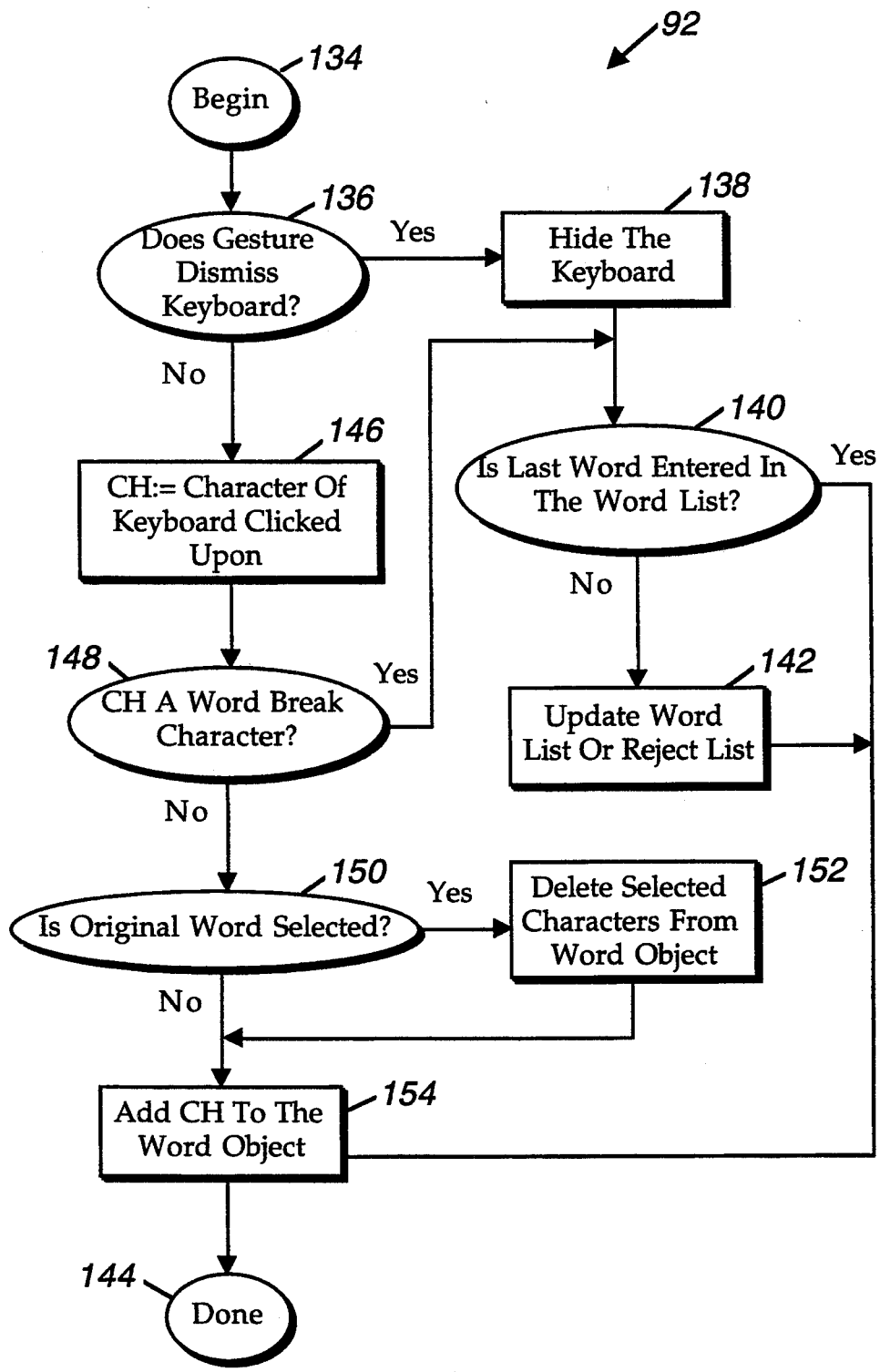
FIG. 9 is a flow diagram of the "Process Keyboard Gesture" step of FIG. 3.

In FIG. 9, the process step 92 is described in greater detail. The process 92 begins at 134 and, in a step 136, it is determined whether the gesture "dismisses" the keyboard. Referring briefly to FIG. 8, the keyboard 132 may be dismissed by pressing the "close" button B in the lower right-hand corner of the keyboard 132 with the stylus 38. If the gesture does dismiss the keyboard, a step 138 hides the keyboard. Again, the keyboard 132 can be hidden by simply informing the view system of the computer system 10 to remove the keyboard from view. Next, in a step 140, it is determined whether the last word entered by the keyboard is in the dictionary list. The "last word entered" is the last word tapped on the keyboard 132. For example, if the user taps "Hi Mom", the last word entered by the keyboard is "Mom." The dictionary list is preferably a list of words used by the word recognizer that aid in the recognition process. Simply put, if a recognized word object is found in the dictionary list, the word recognizer has a higher level of confidence that the word object was properly recognized. If the last entered word was not in the dictionary list, either the dictionary list or the reject list is updated in a step 152, and the process is completed at 144. The process is also completed at 144 if step 140 determines that the last word entered by the keyboard 132 is in the dictionary list.

If the step 136 determines that the gesture did not dismiss the keyboard, a step 146 defines a variable CH as the character of the keyboard that is clicked upon by the stylus 38. Next, in a decision step 148, it is determined whether CH is a word break character. Word break characters include the spacebar, the return key, punctuation, and special characters (such as parentheses) on the keyboard 132. The significance of a word break character is that a complete word has been entered by means of the keyboard 132. If the variable CH is a word break character, the step 148 turns over process control to step 140. If CH is not a word break character, a decision step 150 determines whether the original word object W is selected on the screen. Again, selection is preferably indicated by a reverse highlighting as illustrated in FIG. 8. If the word is selected, a step 152 deletes the selected characters of the word object from the screen 52. In the displayed example, all of the characters of the word object W are selected, therefore the entry of any one character from the keyboard 132 would erase the entire word W in a step 152. Alternatively, if only a portion of a word object is selected, the entry of a character from the keyboard 132 only replaces the selected portion of the word object W. Finally, after the completion of step 152, or if it is determined by step 150 that the original word is not selected, the character stored within the variable CH is added to the word object in a step 154. The process is then completed at 144.

Figure 10:
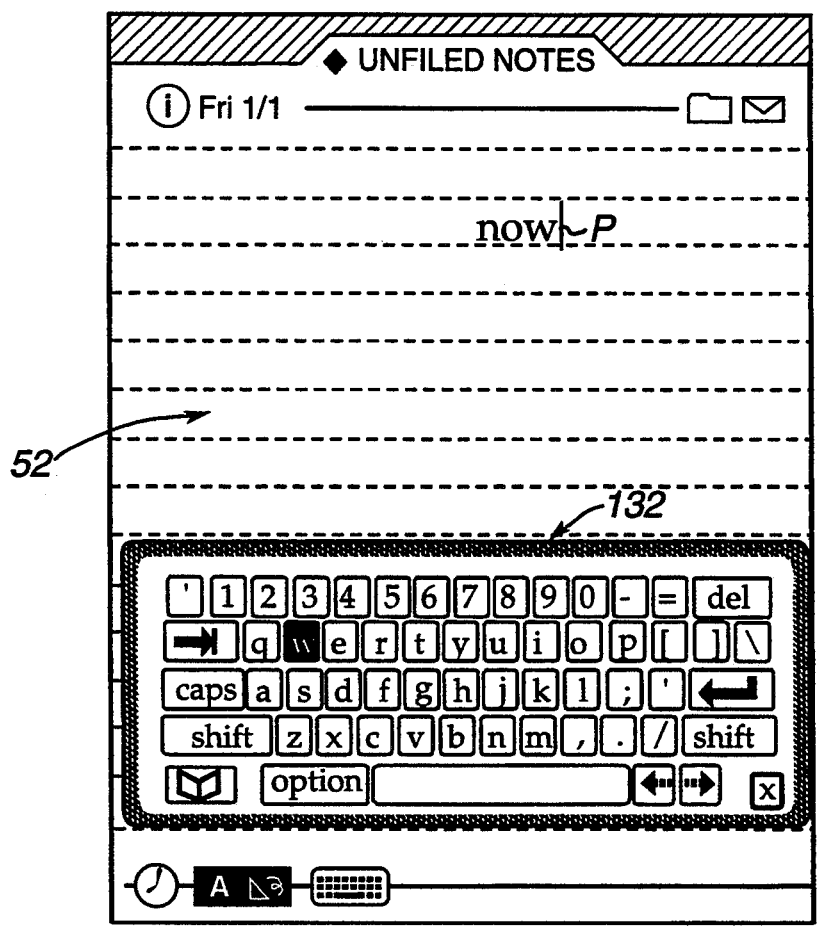
FIG. 10 illustrates the "Add CH To The Word Object" step of FIG. 9.

FIG. 10 is used to illustrate the process 92. Assume that the entire word object W illustrated in FIG. 8 is selected. Then, the activation of the "n" key will erase the "more" and enter the letter "n" in its place. A subsequent pressing of the "o" and "w" keys will enter those letters into the system as well. The new word object is now "now", which completely replaces the original word W. An insert placement bar P indicates where the next letter selected from the keyboard 132 will be placed on the screen 52.

Figure 11:
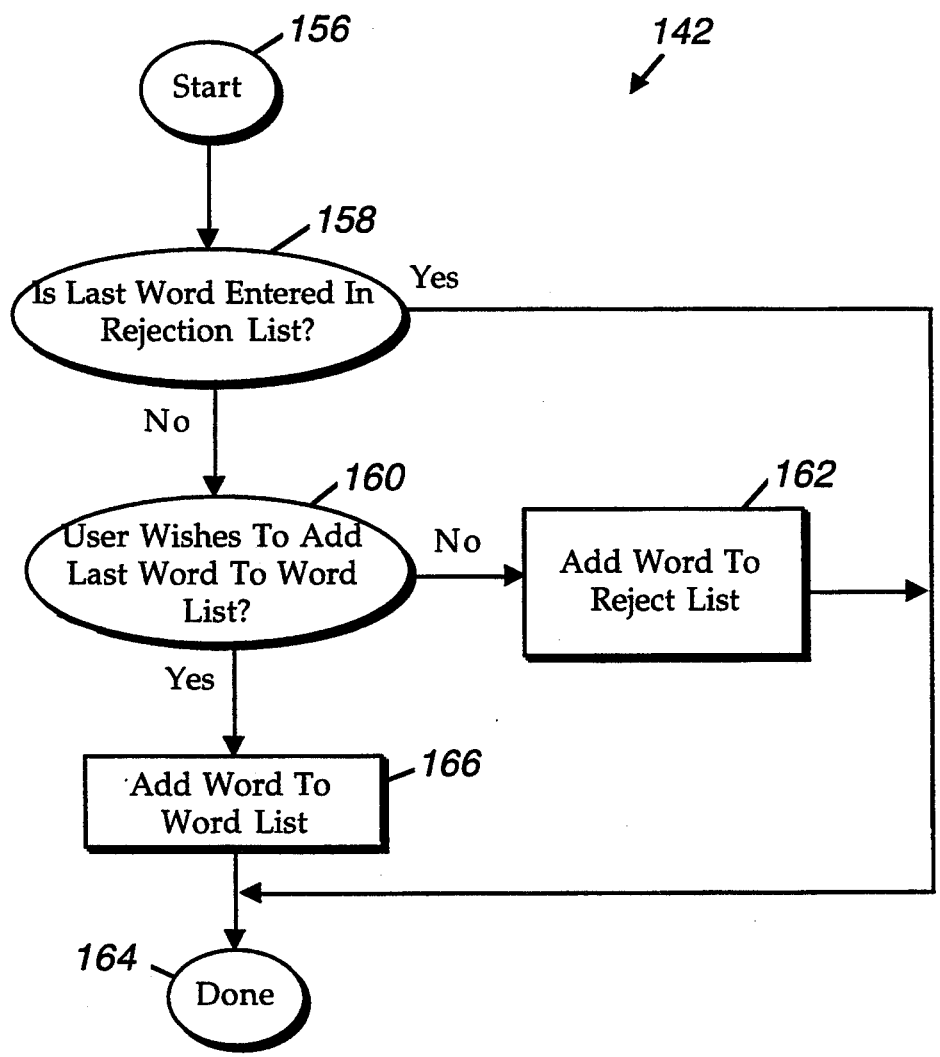
FIG. 11 is a flow diagram illustrating the "Update Word List Or Reject List" step of FIG. 9.

FIG. 11 illustrates the process step 142 of FIG. 9 in greater detail. The process 142 begins at 156 and, in a decision step 158, it is determines whether the last word entered by the keyboard 132 is in the rejection list. The rejection list is a list of words that were not in the dictionary list which, nonetheless, the user decided not to enter into the dictionary list. This step 158 therefore prevents the system from repeatedly asking a user whether they wished to enter a word into the dictionary list. If the last word entered by keyboard 132 is in the rejection list, the process 142 is completed as indicated at 164.

If the last word entered by keyboard 132 is not in the rejection list as determined by step 158, a step 160 determines whether the user wishes to add the last word entered by the keyboard 132 into the dictionary list. If they do not, the word is added to the rejection list as step 162, and the process is again completed at 164. If the process step 160 determines that the user does wish to add the last word to the dictionary list, the word is added to the dictionary list in a step 166 and the process is completed at 164. As mentioned previously, the dictionary list is preferably the same dictionary list that is used in the word recognition system of computer system 10.

Figure 12:
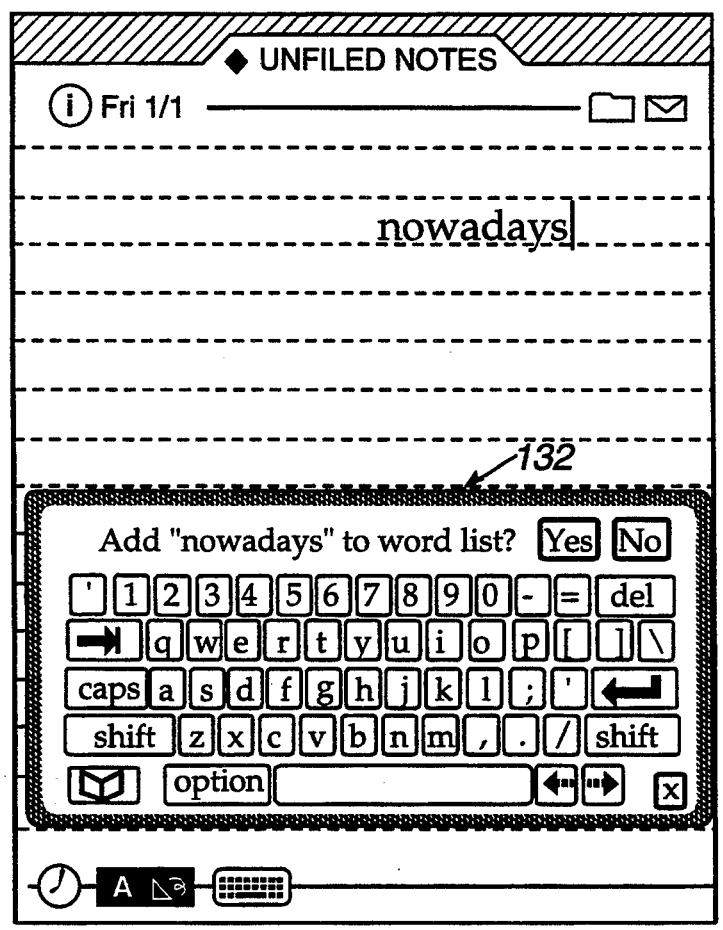
FIG. 12 illustrates the "User Wishes To Add Last Word To Word List?" step of FIG. 11.

FIG. 12 is used to illustrate the process step 160 of FIG. 11. Assume that a user has typed in "nowadays" on keyboard 132 and then dismisses the keyboard by hitting the "return" key. The system will present a message at the top of the keyboard 132 asking whether the user wishes to add the word "nowadays" to the word list. If the user presses the "yes" button, step 166 of FIG. 11 will be executed. If the user presses the "no" button, step 162 of FIG. 11 will be executed.

While this invention has been described in terms of several preferred embodiments, there are alterations, permutations, and equivalents which fall within the scope of this invention. It should also be noted that there are may alternative ways of implementing the processes of the present invention. It is therefore intended that the following appended claims be interpreted as including all such alterations, permutations, and equivalents as fall within the true spirit and scope of the present invention.

What is claimed is:

1. A method for correcting recognized words in a computer system comprising the steps of:
   entering an ink object into a computer system with a stylus and an input tablet overlaying a display of said computer system;
   recognizing the ink object as a word object, wherein said word object is a selected one of a number of alternative recognized word objects for said ink object;
   displaying said word object on said display;
   detecting an alternative word list gesture made by said user on said tablet over said displayed word object with said stylus;
   displaying a list of said alternative word objects for said displayed word object on said display in response to detecting said alternative word list gesture; and
   detecting a selection of one of said alternative word objects by said user by engaging said stylus with said tablet over said alternative word object and replacing said displayed word object with said selection.

2. A method as recited in claim 1 wherein said list of alternative words includes a shifted-case version of said word object, where at least a first character of said shifted-case version is of an opposite case as at least a first character of said word object.

3. A method as recited in claim 2 wherein said number of alternative words are provided by a word recognizer which performed said recognizing step.

4. A method as recited in claim 3 further comprising the step of displaying an image of said ink object on said display proximate to said list of alternative words after said alternative word gesture has been detected.

5. A method as recited in claim 4 wherein said step of detecting a selection of one of said alternative words includes detecting a selection of one of said shifted-case version, said number of alternative words provided by said word recognizer, and said ink object, and replacing said word object with said selection.

6. A method as recited in claim 1 further comprising the step of displaying an icon representing a keyboard on said display proximate to said list of alternative words after said alternative word gesture has been detected.

7. A method as recited in claim 6 further comprising the steps of:
   detecting a selection of said icon;
   displaying an image of a keyboard on said display; and
   detecting gestures made by said stylus on said image of said keyboard to enter a replacement word object into said computer system.

8. A method as recited in claim 7 further comprising the steps of:
   looking for said replacement word object in a dictionary list; and
   selectively entering said replacement word object into said dictionary list if said replacement word was not found in said dictionary list.

9. A method as recited in claim 8 wherein said step of selectively entering said replacement word comprises the steps of:
- querying a user whether said replacement word should be entered into said dictionary list; and
- entering said replacement word into said dictionary list at the request of the user.

10. A method as recited in claim 9 wherein said step of selectively entering said replacement word comprises the step of entering said replacement word in a rejection list if said user requests that said replacement word is not to be entered into said dictionary list.

11. A computer system with word correction capabilities comprising:
- a central processing unit (CPU);
- an input tablet overlaying a display of said computer system coupled to said CPU and operative to enter an ink object into said computer system when contacted by a stylus;
- recognizer means implemented by said CPU and operative to recognize said ink object as a word object, wherein said word object is one of a number of alternative recognized word objects for said ink object;
- display means coupled to said CPU and positioned such that said input tablet is overlaying said display means, said display means being operative to display said word object;
- means for detecting an alternative word list gesture made by a user on said tablet pertaining to said displayed word object with said stylus, said means for detecting an alternative word list gesture being implemented on said CPU and said tablet; and
- means for displaying a list of said alternative word objects for said displayed word object on said display means, said means for displaying an alternative list being implemented on said CPU and said display means;
- means for detecting a selection of one of said alternative word objects by a user when said stylus has been engaged with said tablet over said alternative word object and replacing said displayed word object with said selection, said means for detecting a selection being implemented on said CPU and said tablet.

12. A computer system as recited in claim 11 wherein said list of alternative words includes a shifted-case version of said word object, where at least a first character of said shifted-case version is of an opposite case as at least a first character of said word object.

13. A computer system as recited in claim 12 wherein said number of alternative words are provided by said recognizer means.

14. A computer system as recited in claim 13 further comprising means for displaying an image of said ink object on said display means proximate to said list of alternative words after said alternative word gesture has been detected, said means for displaying an image being implemented on said CPU and said display means.

15. A computer system as recited in claim 14 wherein said means for detecting a selection of one of said alternative words includes detecting a selection of one of said shifted-case version, said number of alternative words provided by said word recognizer, and said ink object, and replacing said word object with said selection, said means for detecting a selection being implemented on said CPU and said tablet.

16. A computer system as recited in claim 11 further comprising means for displaying an icon representing a keyboard on said display means proximate to said list of alternative words after said alternative word gesture has been detected, said means for displaying an icon being implemented on said CPU and said display means.

17. A computer system as recited in claim 16 further comprising:
- means for detecting a selection of said icon implemented on said CPU and said tablet;
- means for displaying an image of a keyboard on said display means, said means for displaying being implemented on said CPU and said display means; and
- means for detecting gestures made by said stylus on said keyboard to enter a replacement word object into said computer system, said means for detecting gestures being implemented on said CPU and said tablet.

18. A computer system as recited in claim 17 further comprising:
- means for looking for said replacement word object in a dictionary list; and
- means for selectively entering said replacement word object into said dictionary list if said replacement word was not found in said dictionary list, where said means for looking for said replacement word object and said means for selectively entering said replacement word object are implemented on said CPU.

19. A computer system as recited in claim 18 wherein said means for selectively entering comprises:
- means for querying a user whether said replacement word should be entered into said dictionary list, said means for querying being implemented on said CPU and said display means; and
- means for entering said replacement word into said dictionary list at the request of the user, said means for entering being implemented on said CPU.

20. A computer system as recited in claim 19 wherein said means for selectively entering includes:
- means for entering said replacement word in a rejection list if said user requests that said replacement word is not to be entered into said dictionary list, said means for entering being implemented on said CPU.

* * * * *